US011947054B2

(12) United States Patent
Garing, III et al.

(10) Patent No.: US 11,947,054 B2
(45) Date of Patent: Apr. 2, 2024

(54) DEVICE AND METHOD FOR RAPIDLY MEASURING THE ACTIVITY OF NUCLEAR ISOTOPES CONTAINED WITHIN A CYLINDRICAL ENCLOSURE USING THE CURRENT OUTPUT FROM A LEAD SELF-POWERED DETECTOR ELEMENT

(71) Applicant: Westinghouse Electric Company LLC, Cranberry Township, PA (US)

(72) Inventors: John Garing, III, Chicora, PA (US); Michael D. Heibel, Broomfield, CO (US); Michael Prible, Cranberry Township, PA (US)

(73) Assignee: Westinghouse Electric Company LLC, Cranberry Township, PA (US)

( * ) Notice: Subject to any disclaimer, the term of this patent is extended or adjusted under 35 U.S.C. 154(b) by 57 days.

(21) Appl. No.: 17/660,083

(22) Filed: Apr. 21, 2022

(65) Prior Publication Data

US 2023/0341565 A1 Oct. 26, 2023

(51) Int. Cl.
*G01T 1/167* (2006.01)
*G01M 3/38* (2006.01)

(52) U.S. Cl.
CPC ............... *G01T 1/167* (2013.01); *G01M 3/38* (2013.01)

(58) Field of Classification Search
CPC ................................ G01T 1/167; G01M 3/38
See application file for complete search history.

(56) References Cited

U.S. PATENT DOCUMENTS 4,238,676 A 12/1980 Goldstein et al.
4,381,451 A 4/1983 Chen et al.
5,256,878 A * 10/1993 LeVert ...................... G01T 1/24 250/497.1
2022/0390630 A1 12/2022 Johnson
2023/0152477 A1 5/2023 Heibel et al.

FOREIGN PATENT DOCUMENTS

JP S5114088 A 2/1976
WO WO-2013067637 A1 * 5/2013 ............. G01T 1/167

OTHER PUBLICATIONS

Partial Search Report for corresponding International Application No. PCT/US2023/019389, dated Jul. 4, 2023.

* cited by examiner

*Primary Examiner* — David P Porta
*Assistant Examiner* — Fani Polyzos Boosalis
(74) *Attorney, Agent, or Firm* — K&L Gates LLP

(57) ABSTRACT

A radioactivity measurement device for measuring an activity level of a radioisotope source is provided. The radioactivity measurement device comprises a housing and a self-powered detector. The housing comprises an outer shell and an inner shell, wherein the inner shell is adapted to house an insertable radioisotope source, and wherein the outer shell and the inner shell are configured to form a hollow annular region. The self-powered detector, positioned within the hollow annular region of the housing, comprises at least one tubular emitter configured to provide a source of electron emission proportional to a radioisotope activity level of the insertable radioisotope source and at least one tubular collector configured to sink the electron emission. A radioactivity level measurement system comprising at least one radioactivity measurement device, a shipping cask incorporating the radioactivity level measurement system and a method for shipping the shipping cask are also provided.

20 Claims, 7 Drawing Sheets

DEVICE AND METHOD FOR RAPIDLY MEASURING THE ACTIVITY OF NUCLEAR ISOTOPES CONTAINED WITHIN A CYLINDRICAL ENCLOSURE USING THE CURRENT OUTPUT FROM A LEAD SELF-POWERED DETECTOR ELEMENT

BACKGROUND

Radioisotopes, such as Cobalt-60 (Co-60), are packaged into production capsules and shipped to their final destination for commercial applications. Accurate measurements of radioactivity levels contained within these production capsules are required prior to shipment of the capsules. Current devices and methods used to obtain these measurements, such as, for example, source range devices used in CANDU reactors, can contribute to measurement uncertainty and operating labor costs. A need exists to simplify radioisotope activity measurement devices and methods to minimize the time needed to complete these measurements and/or maximize the accuracy of measurements.

SUMMARY

The following summary is provided to facilitate an understanding of some of the innovative features unique to the aspects disclosed herein, and is not intended to be a full description. A full appreciation of the various aspects disclosed herein can be gained by taking the entire specification, claims, and abstract as a whole.

In various aspects, a radioactivity measurement device for measuring an activity level is disclosed. In some aspects, the radioactivity measurement device includes a housing comprising an outer shell and an inner shell, wherein the inner shell is adapted to house an insertable radioisotope source, wherein the outer shell and the inner shell are configured to form a hollow annular region; and a self-powered detector (hereinafter "SPD") positioned within the hollow annular region. In some aspects, the SPD comprises a tubular emitter, wherein the tubular emitter is configured to provide a source of electron emission E proportional to a radioisotope activity level of the insertable radioisotope source; a first electrical interface electrically connected to the tubular emitter; tubular collector, wherein the at least one tubular collector is configured to sink the electron emission E; a second electrical interface electrically connected to the at least one tubular collector; and at least one electrical insulation layer comprising an electrically insulating material, wherein the at least one electrical insulation layer is configured to insulate the at least one tubular emitter from the at least one tubular collector; wherein the first electrical interface and the second electrical interface are adapted to output an electrical current I corresponding to the electron emission E.

In various aspects, a radioactivity level measurement system comprising at least one radioactivity measurement device is disclosed. In some aspects, the at least one radioactivity measurement device includes a housing comprising an outer shell and an inner shell, wherein the inner shell is adapted to house an insertable radioisotope source, wherein the outer shell and the inner shell are configured to form a hollow annular region; and a SPD positioned within the hollow annular region. In some aspects, the SPD of the at least one radioactivity measurement device can comprise a tubular emitter, wherein the tubular emitter is configured to provide a source of electron emission E proportional to a radioisotope activity level of the insertable radioisotope source; a first electrical interface electrically connected to the tubular emitter; tubular collector, wherein the at least one tubular collector is configured to sink the electron emission E; a second electrical interface electrically connected to the at least one tubular collector; and at least one electrical insulation layer comprising an electrically insulating material, wherein the at least one electrical insulation layer is configured to insulate the at least one tubular emitter from the at least one tubular collector; wherein the first electrical interface and the second electrical interface are adapted to output an electrical current I corresponding to the electron emission E.

These and other objects, features, and characteristics of the present disclosure, as well as the methods of operation and functions of the related elements of structure and the combination of parts and economies of manufacture, will become more apparent upon consideration of the following description and the appended claims with reference to the accompanying drawings, all of which form a part of this specification, wherein like reference numerals designate corresponding parts in the various figures. It is to be expressly understood, however, that the drawings are for the purpose of illustration and description only and are not intended as a definition of the limits of any of the aspects disclosed herein.

BRIEF DESCRIPTION OF THE DRAWINGS

The various aspects described herein, together with objects and advantages thereof, may best be understood by reference to the following description, taken in conjunction with the accompanying drawings as follows.

Figure 1:
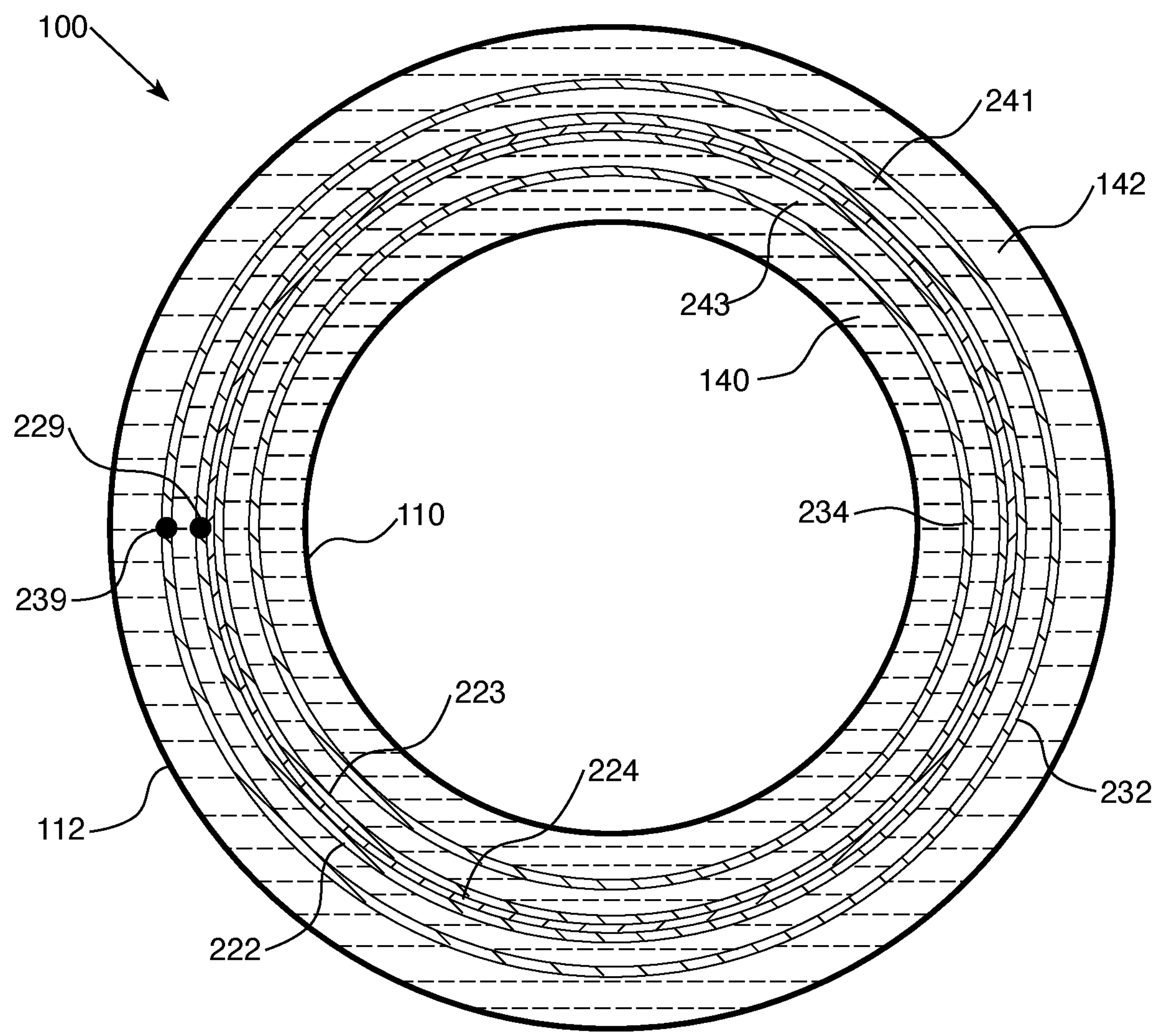
FIG. 1 is a radial cross-section view of a radioactivity measurement device, in accordance with at least one non-limiting aspect of the present disclosure.

Corresponding reference characters indicate corresponding parts throughout the several views. The exemplifications set out herein illustrate various aspects of the present disclosure, in one form, and such exemplifications are not to be construed as limiting the scope of any of the aspects disclosed herein.

DETAILED DESCRIPTION

Certain exemplary aspects of the present disclosure will now be described to provide an overall understanding of the principles of the composition, function, manufacture, and use of the compositions and methods disclosed herein. An example or examples of these aspects are illustrated in the accompanying drawing. Those of ordinary skill in the art will understand that the compositions, articles, and methods specifically described herein and illustrated in the accompanying drawing are non-limiting exemplary aspects and that the scope of the various examples of the present invention is defined solely by the claims. The features illustrated or described in connection with one exemplary aspect may be combined with the features of other aspects. Such modifications and variations are intended to be included within the scope of the present invention.

Reference throughout the specification to "various examples," "some examples," "one example," "an example," or the like, means that a particular feature, structure, or characteristic described in connection with the example is included in an example. Thus, appearances of the phrases "in various examples," "in some examples," "in one example," "in an example," or the like, in places throughout the specification are not necessarily all referring to the same example. Furthermore, the particular features, structures, or characteristics may be combined in any suitable manner in an example or examples. Thus, the particular features, structures, or characteristics illustrated or described in connection with one example may be combined, in whole or in part, with the features, structures, or characteristics of another example or other examples without limitation. Such modifications and variations are intended to be included within the scope of the present examples.

In the following description, like reference characters designate like or corresponding parts throughout the several views of the drawings. Also in the following description, it is to be understood that such terms as "forward," "rearward," "left," "right," "above," "below," "upwardly," "downwardly," and the like are words of convenience and are not to be construed as limiting terms.

Radioisotopes are unstable isotopes of elements having excess nuclear energy. In general, radioisotopes may be produced naturally or artificially. In the context of nuclear fission, various radioisotopes are unavoidably formed as products of a fission event. Alternatively, synthetic radioisotopes may be deliberately produced in the form of a radioisotope production capsule for use in various commercial applications. For example, Cobalt-60 (hereinafter "Co-60"), a radioisotope of Cobalt-59 (hereinafter "Co-59"), may be deliberately produced by bombarding a Co-59 target with thermal neutrons produced by a neutron source. Synthetic radioisotopes can be packaged into a production capsule and used as a radioisotope source thereafter.

As a result of their excess nuclear energy, radioisotopes undergo radioactive decay thereby emitting ionizing radiation which may include subatomic particles or electromagnetic waves. This ionizing radiation is used in various applications including nuclear medicine, food sterilization and industrial manufacture. For example, radioisotope production capsules comprising Co-60 are used in radiotherapy as a gamma radiation source to kill cancerous cells in a patient's body.

The amount of ionizing radiation produced by a radioisotope production capsule is typically quantified as an activity level in units of curies (Ci). Because of the inherent danger in transporting and handling radioactive materials, current regulations require that shipments containing radioisotope sources do not exceed required activity level limits. Additionally, the activity levels of these radioisotope sources must be validated to ensure that the shipments meet or exceed the activity levels contracted between the supplier and the customer. Accordingly, various aspects of the present disclosure provide various methods and devices for promptly and accurately determining an activity level of a radioisotope source without the need for instrument setup, material sampling and/or laboratory analyses.

Various methods and devices provided by the present disclosure optimize the technical and economic aspects of performing a radioisotope activity level measurement in commercial applications such as, for example, validation of total activity levels in shipments of target production capsules containing radioisotopes. In some implementations, the optimization can allow for more rapid measurements of production capsule activity levels and/or more accurate measurements thereby providing decreased costs associated radioactive material transport while maintaining adherence to shipping regulations.

Referring to FIG. 1, a cross-section view of a radioactivity measurement device 100 is provided in accordance with at least one non-limiting aspect of the present disclosure. The radioactivity measurement device 100 includes a housing and a SPD. In various examples, the housing includes an inner shell 110 and an outer shell 112; and the SPD includes a tubular emitter 222, a first electrical interface 229, a tubular collector 232, a second electrical interface 239 and an electrical insulation 241. Each of the elements 110, 112, 222, 232 and 241 of the radioactivity measurement device 100 can be configured as layers disposed over one another as shown in FIG. 1. In some examples, the SPD can optionally include a second tubular emitter layer 223, a second tubular collector layer 234, a second electrical insulation layer 241, and a third electrical insulation layer 243. In some examples, the measurement device 100 can be configured with a cylindrical geometry or other tubular shape. In a layered cylindrical configuration of the measurement device 100, each of the layers 110, 112, 222, 232, and 241 may be arranged concentrically in the order as shown in FIG. 1. Other geometries are contemplated by the present disclosure. For example, in some implementations, a measurement device 100 can be configured with a cubical geometry, a spherical geometry, or a rectangular-prism geometry.

The region enclosed by inner shell layer 110 is configured as a hollow cavity. The dimensions and/or geometry of the inner shell layer 110 can be configured to ensure that a radioisotope source can be easily inserted and/or nested in the hollow cavity surrounded by the inner shell layer 110. In various examples, the length of the inner shell layer 110 is configured to be substantially the same as, or slightly larger than, the length of a radioisotope production capsule. In some examples, the inner shell layer 110 may be configured with a cross-section geometry that is substantially the same as, or slightly larger than, a cross-section of an insertable radioisotope production capsule.

The housing can be configured to form a hollow annular region. In various examples, the hollow annular region contained by the housing is formed between the inner shell layer 110 and the outer shell layer 112. In some examples, the housing includes an electrical insulation layer 140 disposed around the inner shell layer 110 and an electrical insulation layer 142 lining the inner wall of outer shell layer 112. In certain examples, the hollow annular region is defined as the region between the layers 140 and 142. The electrical insulation layers 140 and 142 can comprise aluminum oxide, magnesium oxide, or a combination thereof.

Figure 2:
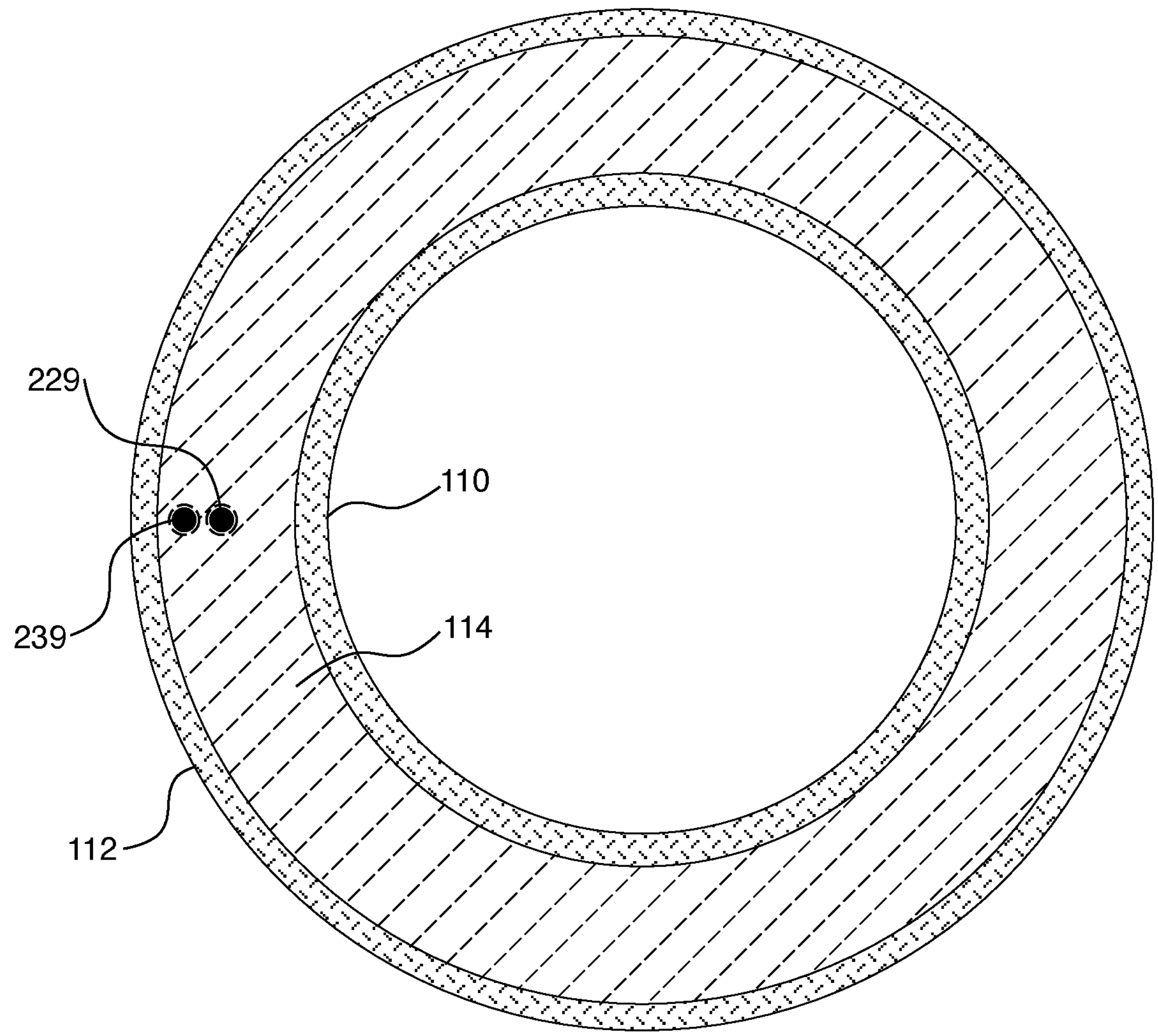
FIG. 2 is a plan view of a radioactivity measurement device, in accordance with at least one non-limiting aspect of the present disclosure.

FIG. 2 depicts a plan view of a radioactivity measurement device 100, in accordance with at least one non-limiting aspect of the present disclosure. In some examples, the radioactivity measuring device 100 can include a top ceramic insulation ring 114. The top ceramic insulation ring 114 can be configured to cover an axial end of the SPD without impeding access to electrical interfaces 229 and 239. For example, the top ceramic insulation ring 114 can be configured with a pass-through for the electrical interfaces 229 and 239.

Figure 3:
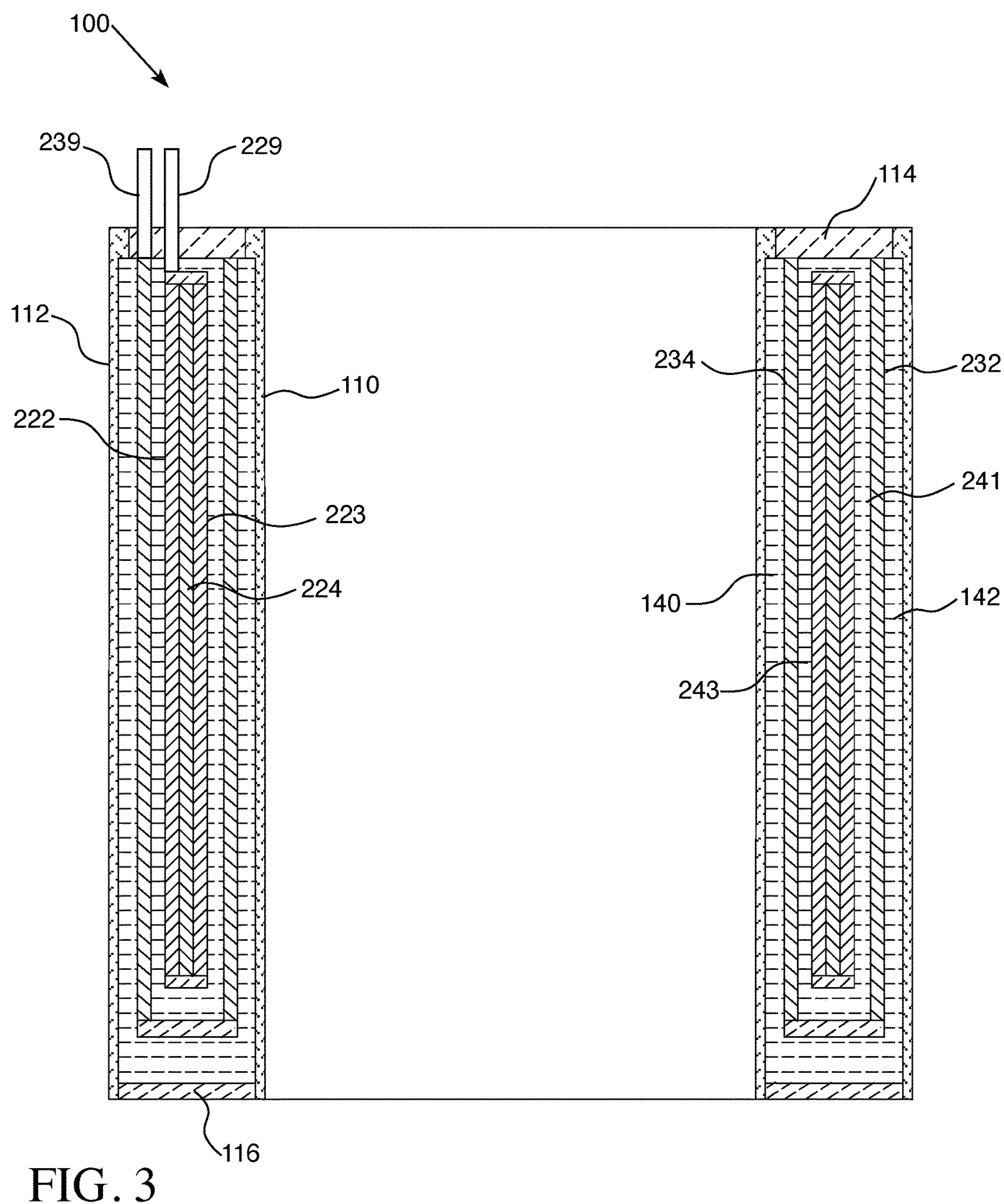
FIG. 3 is an axial cross-section view of the radioactivity measurement device of FIG. 1, in accordance with at least one non-limiting aspect of the present disclosure.

Referring to FIG. 3, an axial cross-section view of the radioactivity measurement device 100 of FIG. 1 is provided. In some examples, the radioactivity measurement device 100 includes a bottom shell ring 116. The bottom shell ring 116 can configured to substantially cover the entire bottom cross-sectional area enclosed by the outer shell layer 112.

Figure 4:
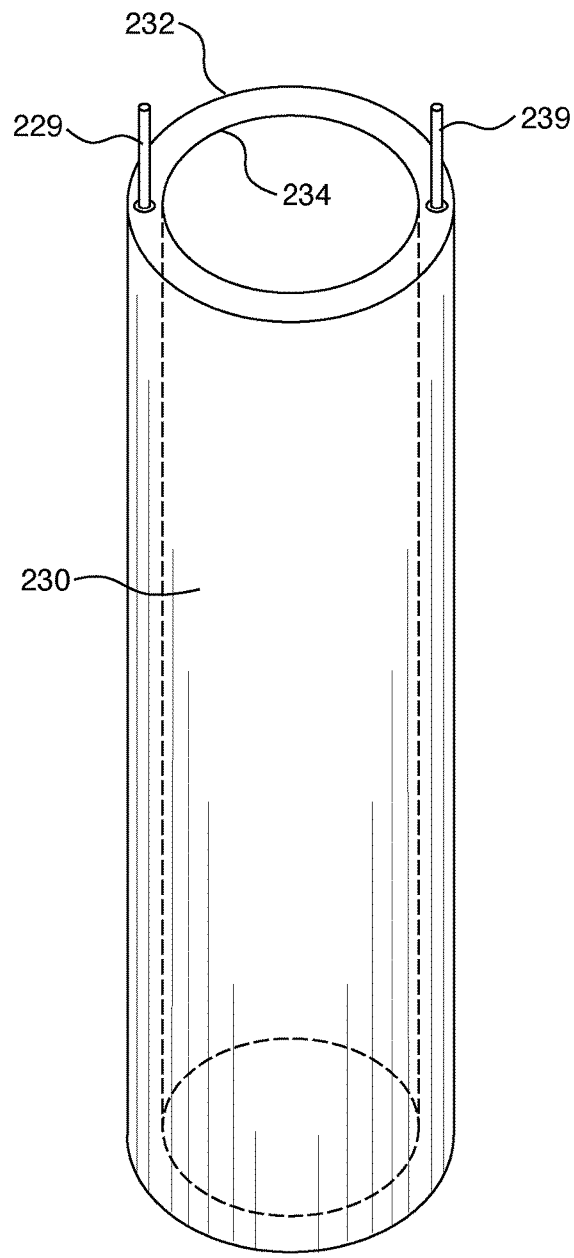
FIG. 4 is a perspective view of a SPD, in accordance with at least one non-limiting aspect of the present disclosure.

Referring to FIG. 4, a perspective view of a self-powered detector is provided, in accordance with at least one non-limiting aspect of the present disclosure. The SPD is configured to fit within the hollow annular region defined by the housing. In some examples, the SPD is configured to be press fit or slip fit into the hollow annular region of the housing. In certain examples, the SPD may be configured to have an outer diameter of about 0.385 inches and an axial length of about 1.5 inches.

Figure 5:
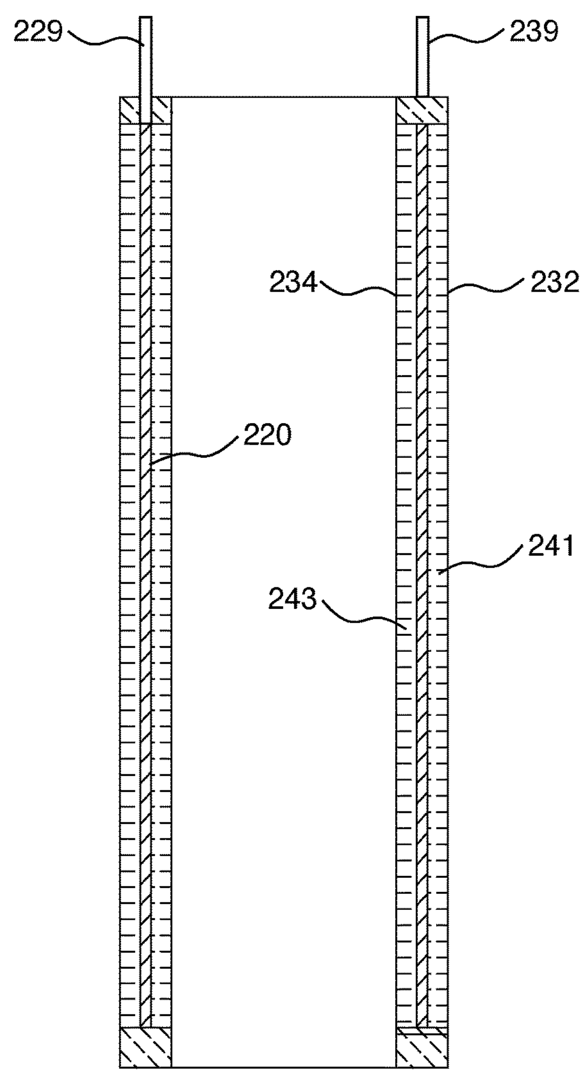
FIG. 5 is an axial cross-section view of the SPD of FIG. 4, in accordance with at least one non-limiting aspect of the present disclosure.
Figure 6:
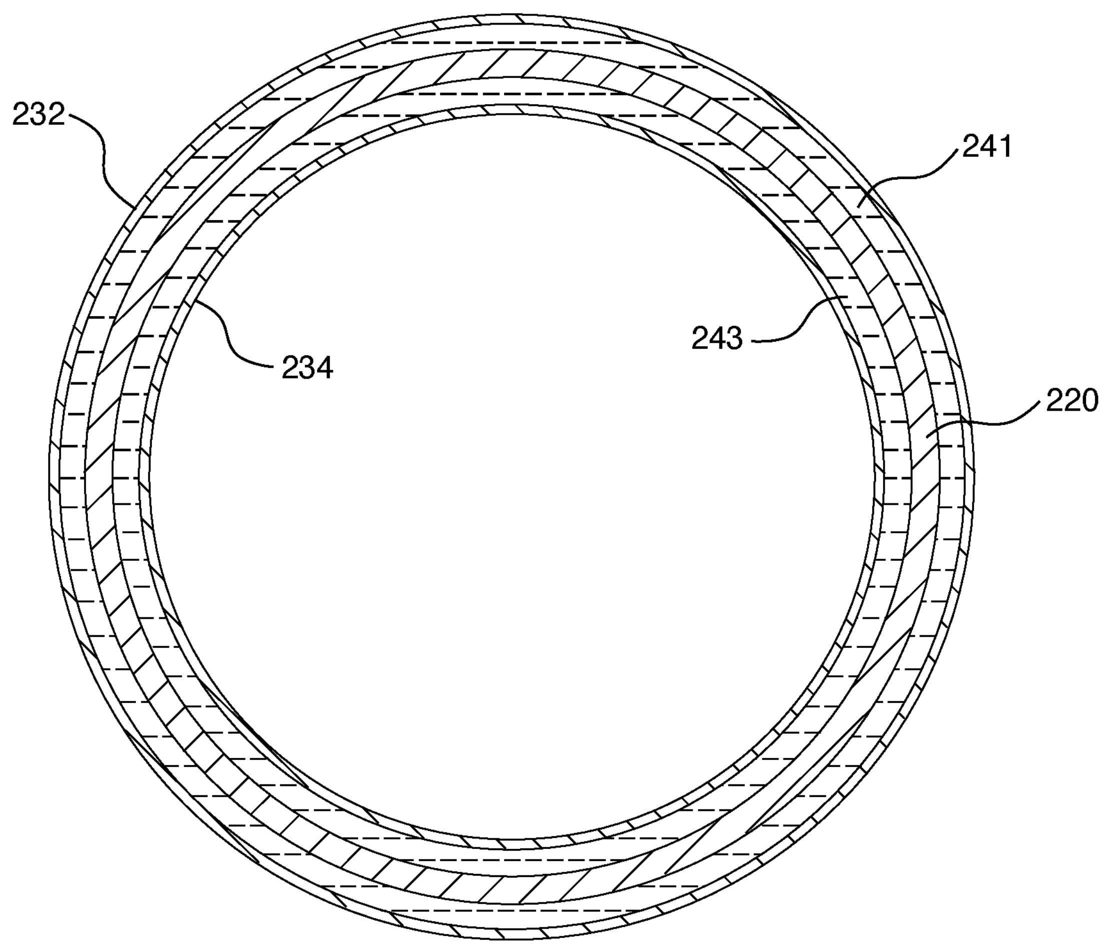
FIG. 6 is a radial cross-section view of the SPD of FIG. 5, in accordance with at least one non-limiting aspect of the present disclosure.

FIG. 5 and FIG. 6 respectively depict an axial cross-section view and a radial cross-section view of the SPD 230 of FIG. 4. In various examples, the SPD may include an emitter 220, a collector 230, an electrical insulation layer 241, a first electrical interface 229 and a second electrical interface 239. The electrical insulation layer 241 is configured to electrically insulate the emitter 220 from the collector 230. In various examples, the electrical insulation layer 241 can comprise aluminum oxide, magnesium oxide, or a combination thereof. The thickness of the electrical insulation layer 241 can be configured to provide a desired electrical resistance.

Figure 7:
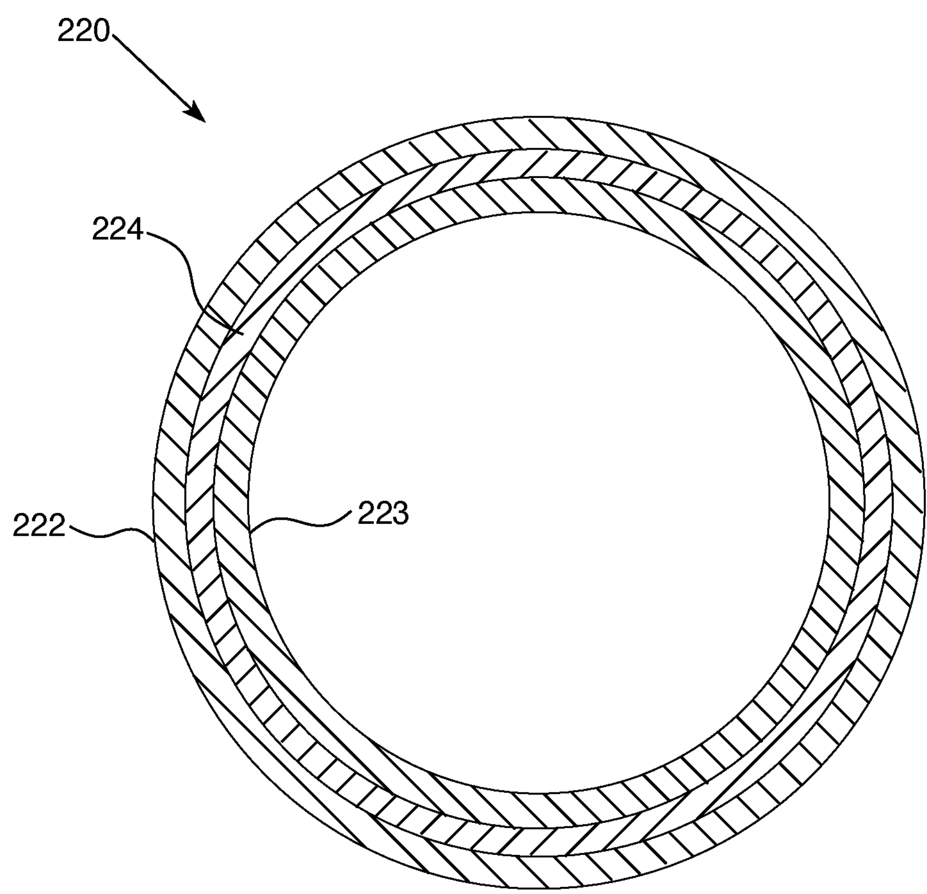
FIG. 7 is a radial cross-section view of a tubular emitter, in accordance with at least one non-limiting aspect of the present disclosure.

Referring to FIG. 7, a radial cross-section view of an emitter 220 is provided, in accordance with at least one non-limiting aspect of the present disclosure. In various examples, the emitter 220 can be configured as a cylinder including at least one tubular emitter layer 222. In certain examples, the tubular emitter layer 222 can have a thickness of about 1.0 mm. The emitter 220 comprises a tubular emitter layer 222 comprising a material responsive to radioactive materials. For example, the tubular emitter layer 222 can comprise a high density material primarily responsive to gamma radiation or neutron radiation. In various examples, the tubular emitter layer 222 can comprise a high density and high-Z material. In some examples, the tubular emitter layer 222 comprises a Lead, Tungsten, or Co-59 based material. In certain examples, the tubular emitter layer 222 is Lead-based.

The emitter 220 is configured to substantially surround the inner shell layer 110 and provide a source of electron emission E proportional to an activity level of a radioisotope source. In some examples, upon insertion of a radioisotope source into the inner shell layer 110, the ionizing radiation produced by the radioisotope source may interact with the bound electrons of the emitter layer material. For example, gamma radiation of about 0.6 MeV to 4 MeV emitted by a radioisotope source inserted into the inner shell layer 110 may interact with Lead electrons in a Lead-based emitter layer 222, thereby scattering the electron and promptly producing an electron emission E. The configuration of the emitter 220 can provide an advantage of a linear electron emission response over a wide range of incident ionizing radiation flux without requiring an external biasing source or other compensation requiring an external power supply over the lifetime of the radiation measurement device 100. For example, the operating characteristics of a Lead-based emitter material will not change significantly with use or operating time thereby providing the benefits of operation consistency and longevity.

The emitter 220 can optionally include emitter layers in addition to tubular emitter layer 222. In some examples, the emitter 220 includes a tubular emitter layer 222 and a second tubular emitter layer 223. In certain examples, the emitter 220 includes a tubular emitter layer 222, a second tubular emitter layer 223 and a third tubular emitter layer 224. The optional tubular emitter layers 223 and 224 are configured to have a smaller outer diameter than the inner diameter of emitter layer 222. In some examples, the third tubular emitter layer 224 is positioned between the tubular emitter layer 222 and the second tubular emitter layer 223, as shown in FIG. 7. In some examples, the optional tubular emitter layer 223 and/or 224 is configured to be electrically connected to the emitter layer 222. The second tubular emitter layer 223 and/or the third tubular emitter layer 224 may independently comprise a material primarily responsive to ionizing radiation. In some examples, the second tubular emitter layer 223 comprises the same material as the tubular emitter layer 222. In certain examples, the third tubular emitter layer 224 comprises a different material from the tubular emitter layer 222.

Referring now to FIGS. 4-6, the collector 230 is configured to provide a sink for an electron emission produced by the emitter 220. For example, the collector 230 can include at least one collector layer configured to substantially surround the emitter 220. In various examples, the collector 230 includes a tubular collector layer 232 having an inner diameter greater than the outer diameter of emitter 220. In some examples, the tubular collector layer 232 can comprise a metal or a metal alloy. In certain examples, the tubular collector layer 232 can comprise 316L stainless steel or Inconel 690.

Now referring to FIGS. 5-6, the collector 230 can optionally include a second collector layer 234 and a second electrical insulation layer 243. In various examples, the second tubular collector layer 234 can be positioned radially inward from the tubular collector layer 232. In some examples, a second electrical insulation layer 243 can be disposed around the second tubular collector layer 234. For example, the second electrical insulation layer 243 can be in direct contact with and surround the second tubular collector layer 234. In certain examples, the collector 230 and the emitter 220 are arranged in a sandwich configuration. In one example, the emitter 220 can be positioned in between the tubular collector layer 232 and the second tubular collector layer 234 as shown in FIGS. 5-6. The second electrical insulation layer 243 can comprise aluminum oxide, magnesium oxide, or a combination thereof.

The SPD includes a first electrical interface 229 and a second electrical interface 239. In various examples, the first electrical interface 229 can be electrically connected to the emitter 220 and the second electrical interface 239 can be electrically connected to the collector 230. In some examples, the first electrical interface 229 can be electrically connected to the tubular emitter layer 222 and the second electrical interface 239 can be electrically connected to the tubular collector layer 232. Each of the electrical interfaces can be configured to provide an electrically communicative path between a tubular element and an external auxiliary component. In various examples, the first electrical interface 229 and/or the second electrical interface 239 can comprise a metallic and/or a nonmetallic conduction material. The first electrical interface 229 and/or the second electrical interface 239 can optionally include a shielding material, an insulating material, or a combination thereof.

The first electrical interface 229 and/or the second electrical interface 239 can be configured as an electrical connector, an electrical lead, or a combination thereof. In certain examples, the first electrical interface 229 and/or the second electrical interface 239 can be configured as a pin, a socket, a plug, a header, a terminal, an electrode, an integrated cable assembly, or a wire. In one example, the first electrical interface 229 and/or the second electrical interface 239 are configured as pins axially protruding through a top ceramic insulation ring 114, as shown in FIG. 3.

Now referring to FIGS. 3 and 5, the first electrical interface 229 and the second electrical interface 239 can be positioned on one axial end of a radioactivity measurement device 100. In various examples, the first electrical interface 229 and the second electrical interface 239 can be configured to be coplanar. In certain examples, the first electrical interface 229 and the second electrical interface 239 can be coplanarly positioned in the same radial quadrant or in opposing radial quadrants.

The first electrical interface 229 and the second electrical interface 239 are adapted to output an electrical current I(t) at any time t. For example, when the collector 230 captures an emission of electrons E(t) from the emitter 220, a voltage develops between the emitter 220 and the collector 230 due to an accumulation of captured electrons. When an electrical load is connected to the first electrical interface 229 and the second electrical interface 239, a current I(t) may flow between the first electrical interface 229, the connected load, and the second electrical interface 239 based in part on the voltage between the emitter 220 and the collector 230, and the load's electrical characteristics. In various examples, the current I(t) is on the order of at least 1 nanoampere. In some examples, the current I(t) is on the order of at least 10 microamperes. If a connected load incorporates an electrical meter such as, for example, a voltmeter or an ammeter, an electrical measurement can be taken therewith. This electrical measurement can be interpreted as a radioactivity level $A_{gen}(t)$ corresponding to I(t). For example, inserting a reference radioisotope source having a known radioactivity level $A_{ref}$ into a radioactivity measurement device 100, will deliver a reference current $I_{ref}$ to a load electrically connected to a first electrical interface 229 and a second electrical interface 239. $A_{ref}$ and $I_{ref}$ may then be used to determine a constant of proportionality $\alpha$ specific to the configuration of the measurement device 100 and the radioisotope source. The constant of proportionality $\alpha$ may then be used to determine an unknown radioactivity level of an inserted radioisotope source with I(t) provided that the inserted radioisotope source is of a similar composition to the reference radioisotope source and the measurement device 100.

The process for determining a constant of proportionality described in the previous paragraph may be repeated with another radioisotope source if the radioactivity measurement device is to be used for multiple types of radioisotope sources. For example, $\alpha_{Pb\text{-}Co\text{-}60}$ could be determined with a Co-60 reference radioisotope source inserted into a measurement device 100 configured with a Lead-based emitter. A new constant $\alpha_{Pb\text{-}Cs\text{-}137}$ for measuring the radioactivity level of a Caesium-137 radioisotope source with the same measurement device 100 could subsequently be determined by replacing the Co-60 reference with a Caesium-137 reference radioisotope source.

Since the emitter 220 can be configured to provide an inherently linear electron emission response, the current resulting therefrom is not dependent on any bias voltage or energized electric field. Thus, the radioactivity measurement device 100 does not rely on an external power source to provide a radioactivity level measurement of an insertable radioisotope source. Furthermore, since the current I(t) is inherent of the direct and linear E(t) response to the inserted radioisotope source, the radioactivity measurement device 100 provides the benefit of a prompt, reliable and accurate measurement.

Figure 8:
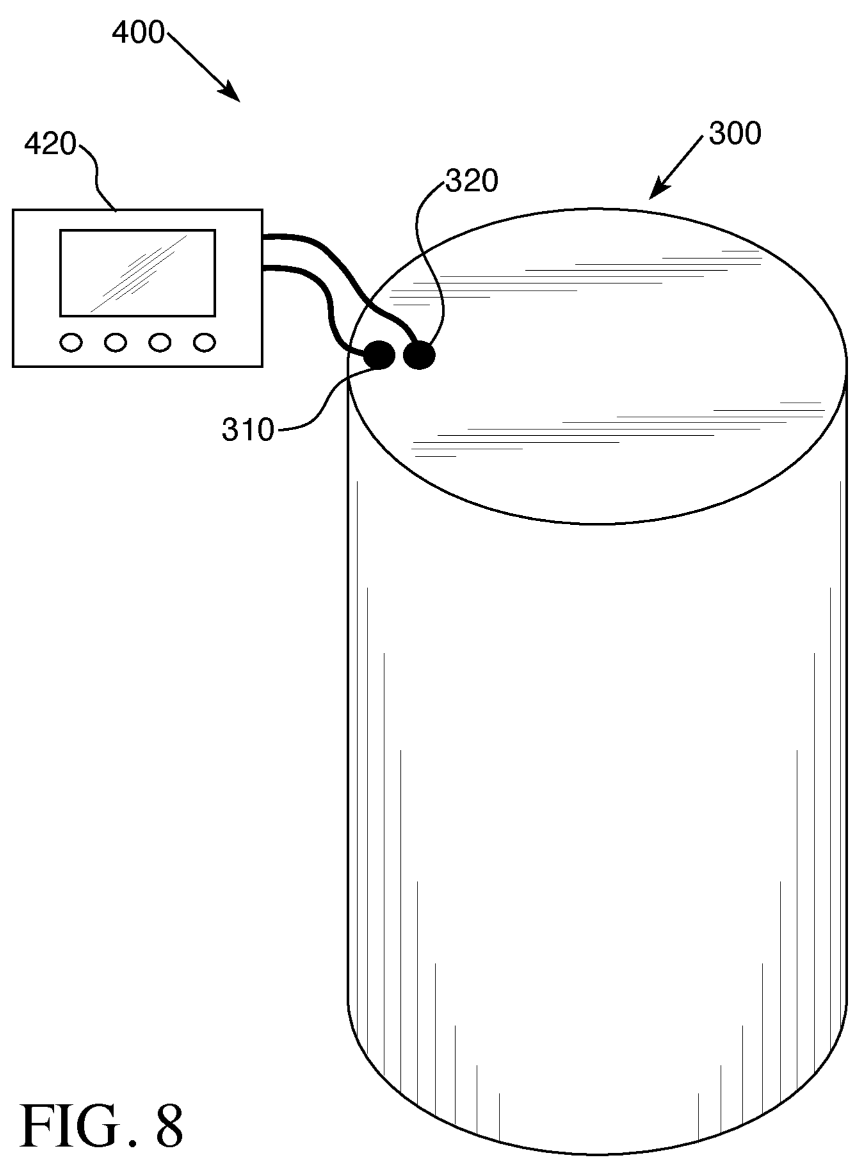
FIG. 8 is a schematic view of a radioactivity level measurement system, in accordance with at least one non-limiting aspect of the present disclosure.

FIG. 8 depicts a schematic representation of a radioactivity level measurement system 400 including at least one radioactivity measurement device 300, in accordance with at least one non-limiting aspect of the present disclosure. Each of the at least one radioactivity measurement devices 300 includes a housing and a SPD, and is similar in many respects to other radioactivity measurement devices disclosed elsewhere in the present disclosure, which are not repeated herein at the same level of detail for brevity. In various examples, each of the radioactivity measurement devices 300 can comprise a housing including an inner shell layer and an outer shell layer; and a SPD comprising at least one tubular emitter layer, a first electrical interface, at least one tubular collector layer, a second electrical interface and at least one electrical insulation layer. In some examples, at least one radioactivity measurement device 300 of the radioactivity level measurement system 400 comprises at least one Lead-based tubular emitter layer. Each of the at least one measurement devices 300 can be independently configured similarly to a measurement device 100 as described hereinabove. Thus, each of the at least one measurement devices 300 can be adapted to house an insertable radioisotope source and output an electrical current based on the response of each measurement device 300 to a respective inserted radioisotope source. In various examples, at least one measurement device 300 of the radioactivity level measurement system 400 is adapted to house an insertable Co-60 source and output an electrical current based on the response of the at least one measurement device 300 to the inserted Co-60 source.

A radioactivity level measurement system 400 configured to include a plurality of the radioactivity measurement devices 300 can house one radioisotope source or a variety of radioisotope sources. For example, a radioactivity level measurement system 400 can comprise a first radioactivity measurement device having a first configuration and a second radioactivity measurement device having a second configuration, wherein the first configuration and second configurations correspond to different radioisotope sources. In various examples, the radioisotope measurement system 400 comprises two or more radioactivity measurement devices 300. In some examples, the radioisotope measurement system 400 comprises two or more radioactivity measurement devices 300 configured to house a Co-60 source or a Caesium-137 source. In certain examples, the radioisotope measurement system 400 comprises a first radioactivity measurement device configured to house an insertable Co-60 source and a second radioactivity measurement device configured to house an insertable Caesium-137 source.

Still referring to FIG. 8, the radioactivity level measurement system 400 can also include an auxiliary interface 420. The auxiliary interface 420 can be configured to input an electrical current I. For example, the auxiliary interface 420 can be electrically connected to the first electrical interface 310 and the second electrical interface 320 of the at least one measurement device 300 to receive a current I produced by the at least one measurement device 300 upon insertion of a radioisotope source into the at least one measurement device 300. The auxiliary interface 420 can be configured with multiple sets of inputs. For example, the auxiliary interface 420 can be electrically connected to a plurality of measurement devices 300. In various examples, the auxiliary interface 420 can be configured to be electrically connected to a first electrical interface and a second electrical interface of each of the plurality of measurement devices 300. In certain examples, the auxiliary interface 420 and the first electrical interface and the second electrical interface of each of the plurality of measurement devices 300 can be electrically connected to an auxiliary control hub.

The auxiliary interface 420 can be configured to calculate, in real time, a radioactivity level of an insertable radioisotope source housed in a measurement device 300. For example, an auxiliary interface 420, electrically connected to a measurement device 300 housing a reference radioisotope source, can be programmed to determine a constant of proportionality $\alpha$ and subsequently use a to interpret a current I(t), produced by a measurement device 300 housing a radioisotope source of unknown activity at a time t, to generate a corresponding radioactivity level $A_{gen}(t)$. In some examples, the auxiliary interface 420 can be programmed with multiple constants of proportionality corresponding to different radioisotope sources and/or different configurations of measurement devices 300. In the multiple input configuration of the auxiliary interface 420, the auxiliary interface 420 can be programmed to interpret a plurality of inputs simultaneously. For example, an auxiliary interface 420 electrically connected to a plurality of measurement devices, each of the devices housing a unique radioisotope source composition and outputting a unique current, can be programmed with an appropriate set of constants of proportionality corresponding to each unique measurement device-radioisotope source pairing to simultaneously generate a set of corresponding radioactivity levels in real time. In certain examples, the auxiliary device 420 can be programmed to output data corresponding to at least one radioisotope source radioactivity level. The auxiliary device 420 can be programmed to output data continuously, periodically or in response to a trigger event.

The radioactivity level measurement system 400 can be incorporated into a container adapted for transportation or storage of a plurality of radioactivity measurement devices. For example, the radioactivity measurement system 400 can be incorporated into a shipping cask adapted to house a plurality of radioisotope sources. In various examples, the shipping cask is adapted to house a plurality of radioisotope production capsules. In some examples, the shipping cask is adapted to house a plurality of Co-60 production capsules. A shipping cask incorporating a radioactivity level measurement system can provide an advantage of continuous or on-demand monitoring of the contents contained within the cask without the undesirable risk of exposure to ionizing radiation required by conventional sampling methods.

As described herein, the shipping cask adapted to house a plurality of radioisotope sources can be incorporated into a transportation method. For example, a method for shipping a shipping cask can include inserting a radioisotope production capsule into an inner shell of each of a plurality of radioactivity measurement devices of the shipping cask and determining a total activity level. In some examples, determining a total activity level comprises calculating a real time activity level for each inserted radioisotope production capsule and combining each of the calculated real time activity levels to obtain a total activity level. In certain examples, the method 600 includes inserting a Co-60 production capsule into an inner shell of each of a plurality of radioactivity measurement devices of the shipping cask and determining a total activity level of the shipping cask. In the event that a shipping cask has a total activity exceeding the allowable limit or below a contracted limit, the use of a radioactivity measurement system in a method for shipping as disclosed hereinabove can provide prompt and reliable verification of the radioactive contents in a shipping cask, thereby avoiding any economic and/or safety issues associated with shipping a cask having deficient radioactivity levels.

Various aspects of the invention according to the present disclosure include, but are not limited to, the aspects listed in the following numbered clauses.

1. A radioactivity measurement device for measuring an activity level, the radioactivity measurement device comprising:
   - a housing comprising an outer shell and an inner shell, wherein the inner shell is adapted to house an insertable radioisotope source, wherein the outer shell and the inner shell are configured to form a hollow annular region;
   - a self-powered detector positioned within the hollow annular region of the housing, the self-powered detector comprising:
     - at least one tubular emitter, wherein the at least one tubular emitter is configured to provide a source of electron emission E proportional to a radioisotope activity level of the insertable radioisotope source;
     - a first electrical interface electrically connected to the at least one tubular emitter;
     - at least one tubular collector, wherein the at least one tubular collector is configured to sink the electron emission E;
     - a second electrical interface electrically connected to the at least one tubular collector; and
     - at least one electrical insulation layer comprising an electrically insulating material, wherein the at least one electrical insulation layer is configured to insulate the at least one tubular emitter from the at least one tubular collector;
   - wherein the first electrical interface and the second electrical interface are adapted to output an electrical current I corresponding to the electron emission E.
2. The radioactivity measurement device of clause 1, wherein the insertable radioisotope source is in the form of a radioisotope production capsule.
3. The radioactivity measurement device of any one of clauses 1-2, wherein the at least one tubular emitter comprises Lead.
4. The radioactivity measurement device of any one of clauses 1-3, wherein the at least one tubular emitter comprises Tungsten, Cobalt-59, or a combination thereof.
5. The radioactivity measurement device of any one of clauses 1-4, wherein the at least one tubular emitter comprises a first tubular emitter and a second tubular emitter, wherein the first tubular emitter and the second tubular emitter are electrically connected, and wherein the first tubular emitter is positioned radially inward of the second tubular emitter.
6. The radioactivity measurement device of any one of clauses 1-5, wherein the at least one tubular collector comprises a first tubular collector and a second tubular collector, wherein the first tubular collector and the second tubular collector are electrically connected, and wherein the first tubular collector is positioned radially inward of the second tubular collector.

7 The radioactivity measurement device of clause 6, wherein the at least one tubular emitter is radially positioned between the first tubular collector and the second tubular collector.

8. The radioactivity measurement device of any one of clauses 1-7, wherein the electrically insulating material comprises aluminum oxide or magnesium oxide.

9. The radioactivity measurement device of any one of clauses 1-7, wherein the electrically insulating material comprises aluminum oxide.

10. The radioactivity measurement device of any one of clauses 1-9, wherein the at least one tubular collector element comprises Inconel, stainless steel, or any combination thereof 11. A radioactivity level measurement system comprising at least one radioactivity measurement device, the at least one radioactivity measurement device comprising:

a housing comprising an outer shell and an inner shell, wherein the inner shell is adapted to house an insertable radioisotope source, wherein the outer shell and the inner shell are configured to form a hollow annular region;

a self-powered detector positioned within the hollow annular region of the housing, the self-powered detector comprising:

at least one tubular emitter, wherein the at least one tubular emitter is configured to provide a source of electron emission E proportional to a radioisotope activity level of the insertable radioisotope source;

a first electrical interface electrically connected to the at least one tubular emitter;

at least one tubular collector, wherein the at least one tubular collector is configured to sink the electron emission E;

a second electrical interface electrically connected to the at least one tubular collector; and at least one electrical insulation layer comprising an electrically insulating material, wherein the at least one electrical insulation layer is configured to insulate the at least one tubular emitter from the at least one tubular collector;

wherein the first electrical interface and the second electrical interface are adapted to output an electrical current I corresponding to the electron emission E.

12. The radioactivity level measurement system of clause 11, further comprising an auxiliary interface configured to accept an electrical current I, wherein the auxiliary interface is electrically connected to the first electrical interface and the second electrical interface of the at least one measurement device.

13. The radioactivity level measurement system of clause 12, wherein the auxiliary interface is configured to calculate a real time activity level based on the following relationship:

$$A_{gen}(t)=\alpha I(t)$$

wherein $A_{gen}(t)$ is a calculated activity level at a time of measurement t, $\alpha$ is a constant of proportionality, and I(t) is an electrical current outputted by the at least one measurement device at the time of measurement t.

14. The radioactivity level measurement system of clause 13, wherein the constant of proportionality $\alpha$ is based in part on a known response of the self-powered detector to a reference radioisotope source.

15. The radioactivity level measurement system of any one of clauses 11-14, wherein the self-powered detector comprises a Lead-based tubular emitter.

16. The radioactivity level measurement system of any one of clauses 11-15, wherein the reference radioisotope source comprises Cobalt-60.

17. A shipping cask comprising a radioactivity level measurement system of any one of clauses 11-16, wherein the shipping cask is adapted to house a plurality of radioisotope sources, wherein the plurality of radioisotope sources comprises at least one radioisotope production capsule.

18. The shipping cask of clause 17, wherein the plurality of radioisotope production capsules comprises Co-60.

19. A method for shipping a shipping cask of any one of clauses 17-18, the method comprising:

inserting a radioisotope production capsule into an inner shell of each of a plurality of radioactivity measurement devices of the shipping cask; and determining a total activity level comprising:

calculating a real time activity level for each inserted radioisotope production capsule; and combining each of the calculated real time activity levels to obtain a total activity level.

20. The method of clause 19, wherein the radioisotope production capsule comprises Co-60.

Various features and characteristics are described in this specification to provide an understanding of the composition, structure, production, function, and/or operation of the invention, which includes the disclosed methods and systems. It is understood that the various features and characteristics of the invention described in this specification can be combined in any suitable manner, regardless of whether such features and characteristics are expressly described in combination in this specification. The Inventors and the Applicant expressly intend such combinations of features and characteristics to be included within the scope of the invention described in this specification. As such, the claims can be amended to recite, in any combination, any features and characteristics expressly or inherently described in, or otherwise expressly or inherently supported by, this specification. Furthermore, the Applicant reserves the right to amend the claims to affirmatively disclaim features and characteristics that may be present in the prior art, even if those features and characteristics are not expressly described in this specification. Therefore, any such amendments will not add new matter to the specification or claims and will comply with the written description, sufficiency of description, and added matter requirements.

With respect to the appended claims, those skilled in the art will appreciate that recited operations therein may generally be performed in any order. Also, although various operational flows are presented in a sequence(s), it should be understood that the various operations may be performed in other orders than those that are illustrated or may be performed concurrently. Examples of such alternate orderings may include overlapping, interleaved, interrupted, reordered, incremental, preparatory, supplemental, simultaneous, reverse, or other variant orderings, unless context dictates otherwise. Furthermore, terms like “responsive to,” “related to,” or other past-tense adjectives are generally not intended to exclude such variants, unless context dictates otherwise.

The invention(s) described in this specification can comprise, consist of, or consist essentially of the various features and characteristics described in this specification. The terms “comprise” (and any form of comprise, such as “comprises”

and “comprising”), “have” (and any form of have, such as “has” and “having”), “include” (and any form of include, such as “includes” and “including”), and “contain” (and any form of contain, such as “contains” and “containing”) are open-ended linking verbs. Thus, a method or system that “comprises,” “has,” “includes,” or “contains” a feature or features and/or characteristics possesses the feature or those features and/or characteristics but is not limited to possessing only the feature or those features and/or characteristics. Likewise, an element of a composition, coating, or process that “comprises,” “has,” “includes,” or “contains” the feature or features and/or characteristics possesses the feature or those features and/or characteristics but is not limited to possessing only the feature or those features and/or characteristics and may possess additional features and/or characteristics.

The grammatical articles “a,” “an,” and “the,” as used in this specification, including the claims, are intended to include “at least one” or “one or more” unless otherwise indicated. Thus, the articles are used in this specification to refer to one or more than one (i.e., to “at least one”) of the grammatical objects of the article. By way of example, “a component” means one or more components and, thus, possibly more than one component is contemplated and can be employed or used in an implementation of the described compositions, coatings, and processes. Nevertheless, it is understood that use of the terms “at least one” or “one or more” in some instances, but not others, will not result in any interpretation where failure to use the terms limits objects of the grammatical articles “a,” “an,” and “the” to just one. Further, the use of a singular noun includes the plural, and the use of a plural noun includes the singular, unless the context of the usage requires otherwise.

In this specification, unless otherwise indicated, all numerical parameters are to be understood as being prefaced and modified in all instances by the term “about,” in which the numerical parameters possess the inherent variability characteristic of the underlying measurement techniques used to determine the numerical value of the parameter. At the very least, and not as an attempt to limit the application of the doctrine of equivalents to the scope of the claims, each numerical parameter described herein should at least be construed in light of the number of reported significant digits and by applying ordinary rounding techniques.

Any numerical range recited herein includes all sub-ranges subsumed within the recited range. For example, a range of “1 to 10” includes all sub-ranges between (and including) the recited minimum value of 1 and the recited maximum value of 10, that is, having a minimum value equal to or greater than 1 and a maximum value equal to or less than 10. Also, all ranges recited herein are inclusive of the end points of the recited ranges. For example, a range of “1 to 10” includes the end points 1 and 10. Any maximum numerical limitation recited in this specification is intended to include all lower numerical limitations subsumed therein, and any minimum numerical limitation recited in this specification is intended to include all higher numerical limitations subsumed therein. Accordingly, Applicant reserves the right to amend this specification, including the claims, to expressly recite any sub-range subsumed within the ranges expressly recited. All such ranges are inherently described in this specification.

As used in this specification, particularly in connection with layers, the terms “on,” “onto,” “over,” and variants thereof (e.g., “applied over,” “formed over,” “deposited over,” “provided over,” “located over,” and the like) mean applied, formed, deposited, provided, or otherwise located over a surface of a substrate but not necessarily in contact with the surface of the substrate. For example, a layer “applied over” a substrate does not preclude the presence of another layer or other layers of the same or different composition located between the applied layer and the substrate. Likewise, a second layer “applied over” a first layer does not preclude the presence of another layer or other layers of the same or different composition located between the applied second layer and the applied first layer.

Whereas particular examples of this invention have been described above for purposes of illustration, it will be evident to those skilled in the art that numerous variations of the details of the present invention may be made without departing from the invention as defined in the appended claims.

What is claimed is:

1. A radioactivity measurement device for measuring an activity level, the radioactivity measurement device comprising:

a housing comprising an outer shell and an inner shell, wherein the inner shell is adapted to house an insertable radioisotope source, wherein the outer shell and the inner shell are configured to form a hollow annular region;

a self-powered detector positioned within the hollow annular region of the housing, the self-powered detector comprising:

at least one tubular emitter, wherein the at least one tubular emitter is configured to provide a source of electron emission E proportional to a radioisotope activity level of the insertable radioisotope source;

a first electrical interface electrically connected to the at least one tubular emitter;

at least one tubular collector, wherein the at least one tubular collector is configured to sink the electron emission E;

a second electrical interface electrically connected to the at least one tubular collector; and at least one electrical insulation layer comprising an electrically insulating material, wherein the at least one electrical insulation layer is configured to insulate the at least one tubular emitter from the at least one tubular collector;

wherein the first electrical interface and the second electrical interface are adapted to output an electrical current I corresponding to the electron emission E.

2. The radioactivity measurement device as claimed in claim 1, wherein the insertable radioisotope source is in the form of a radioisotope production capsule.

3. The radioactivity measurement device as claimed in claim 1, wherein the tubular emitter comprises Lead.

4. The radioactivity measurement device as claimed in claim 1, wherein the tubular emitter comprises Tungsten, Cobalt-59, or a combination thereof.

5. The radioactivity measurement device as claimed in claim 1, wherein the at least one tubular emitter comprises a first tubular emitter and a second tubular emitter, wherein the first tubular emitter and the second tubular emitter are electrically connected, and wherein the first tubular emitter is positioned radially inward of the second tubular emitter.

6. The radioactivity measurement device as claimed in claim 1, wherein the at least one tubular collector comprises a first tubular collector and a second tubular collector, wherein the first tubular collector and the second tubular collector are electrically connected, and wherein the first tubular collector is positioned radially inward of the second tubular collector.

7. The radioactivity measurement device as claimed in claim 6, wherein the at least one tubular emitter is radially positioned between the first tubular collector and the second tubular collector.

8. The radioactivity measurement device as claimed in claim 1, wherein the electrically insulating material comprises aluminum oxide or magnesium oxide.

9. The radioactivity measurement device as claimed in claim 8, wherein the electrically insulating material comprises aluminum oxide.

10. The radioactivity measurement device as claimed in claim 1, wherein the at least one tubular collector comprises Inconel, stainless steel, or any combination thereof.

11. A radioactivity level measurement system comprising at least one radioactivity measurement device, the at least one radioactivity measurement device comprising:

a housing comprising an outer shell and an inner shell, wherein the inner shell is adapted to house an insertable radioisotope source, wherein the outer shell and the inner shell are configured to form a hollow annular region;

a self-powered detector positioned within the hollow annular region of the housing, the self-powered detector comprising:

at least one tubular emitter, wherein the at least one tubular emitter is configured to provide a source of electron emission E proportional to a radioisotope activity level of the insertable radioisotope source;

a first electrical interface electrically connected to the at least one tubular emitter;

at least one tubular collector, wherein the at least one tubular collector is configured to sink the electron emission E;

a second electrical interface electrically connected to the at least one tubular collector; and at least one electrical insulation layer comprising an electrically insulating material, wherein the at least one electrical insulation layer is configured to insulate the at least one tubular emitter from the at least one tubular collector;

wherein the first electrical interface and the second electrical interface are adapted to output an electrical current I corresponding to the electron emission E.

12. The radioactivity level measurement system as claimed in claim 11, further comprising an auxiliary interface configured to accept an electrical current I, wherein the auxiliary interface is electrically connected to the first electrical interface and the second electrical interface of the at least one measurement device.

13. The radioactivity level measurement system as claimed in claim 12, wherein the auxiliary interface is configured to calculate a real time activity level based on the following relationship:

$$A_{gen}(t)=\alpha I(t)$$

wherein $A_{gen}(t)$ is a calculated activity level at a time of measurement t, a is a constant of proportionality, and I(t) is an electrical current outputted by the at least one measurement device at the time of measurement t.

14. The radioactivity level measurement system as claimed in claim 13, wherein the constant of proportionality $\alpha$ is based in part on a known response of the self-powered detector to a reference radioisotope source.

15. The radioactivity level measurement system as claimed in claim 14, wherein the self-powered detector comprises a Lead-based tubular emitter.

16. The radioactivity level measurement system as claimed in claim 14, wherein the reference radioisotope source comprises Cobalt-60.

17. A shipping cask comprising a radioactivity level measurement system as claimed in claim 14, wherein the shipping cask is adapted to house a plurality of radioisotope sources, wherein the plurality of radioisotope sources comprises at least one radioisotope production capsule.

18. The shipping cask as claimed in claim 17, wherein the plurality of radioisotope sources comprises Co-60.

19. A method for shipping a radioisotope production capsule the method comprising:

inserting a radioisotope production capsule into an inner shell of each of a plurality of radioactivity measurement devices of a shipping cask; and determining a total activity level comprising:

calculating a real time activity level for each inserted radioisotope production capsule; and combining each of the calculated real time activity levels to obtain a total activity level.

20. The method as claimed in claim 19, wherein the radioisotope production capsule comprises Co-60.

* * * * *